(12) United States Patent
Monié

(10) Patent No.: US 6,274,074 B1
(45) Date of Patent: Aug. 14, 2001

(54) PROCESS FOR PRODUCING A ROTATING GEAR MADE OF THERMOPLASTICS MATERIAL, AND GEAR THUS OBTAINED

(75) Inventor: Jean Monié, Scionzier (FR)

(73) Assignee: Société Mécanique et de Plastiques Industriels, Cluses (FR)

( * ) Notice: Subject to any disclaimer, the term of this patent is extended or adjusted under 35 U.S.C. 154(b) by 0 days.

(21) Appl. No.: 09/073,249

(22) Filed: May 6, 1998

(30) Foreign Application Priority Data

Jul. 4, 1997 (FR) .................................................. 97 08751

(51) Int. Cl.⁷ ............................. B29C 45/16; F16H 55/17
(52) U.S. Cl. ....................... 264/255; 264/271.1; 264/274; 264/275; 264/279; 264/279.1; 264/328.8; 74/434; 74/DIG. 10
(58) Field of Search ................................. 264/255, 328.8, 264/274, 260, 271.1, 275, 279, 279.1; 425/130; 74/434, DIG. 10

(56) References Cited

U.S. PATENT DOCUMENTS

| | | | |
|---|---|---|---|
| 2,307,129 | * 1/1943 | Hines et al. | ............... 64/27 |
| 3,304,795 | * 2/1967 | Rouverol | ................. 74/411 |
| 3,630,098 | 12/1971 | Oxley | ................. 74/439 |
| 5,307,705 | * 5/1994 | Fenelon | ................. 74/411 |

OTHER PUBLICATIONS

Abstract of European application No. 0 340 812, published Nov. 8, 1989.
Abstract of European application No. 0 303 113, published Feb. 15, 1989.

* cited by examiner

Primary Examiner—Jan H. Silbaugh
Assistant Examiner—Suzanne E McDowell
(74) Attorney, Agent, or Firm—Browdy and Neimark

(57) ABSTRACT

This invention discloses a process for producing a low-noise gear. It consists in producing this gear by the technique of co-injection of a hard matter which will form the outer toothing and the axial portion for engagement on the shaft associated therewith, and of a damping matter which will form the heart of the thermoplastics gear.

6 Claims, 2 Drawing Sheets

PROCESS FOR PRODUCING A ROTATING GEAR MADE OF THERMOPLASTICS MATERIAL, AND GEAR THUS OBTAINED

FIELD OF THE INVENTION

The present invention relates to a process of manufacturing a rotating gear, such as for example a toothed wheel or a bevel gear, made of thermoplastic material, this gear having an outer toothing and an axial portion for engagement, which are both rigid and therefore relatively hard. The invention also relates to a rotating gear obtained by this process.

BACKGROUND OF THE INVENTION

Accompanying FIG. 1, which is an illustration of the known prior art, shows a conventional shaft-pinion assembly which is obtained by moulding a toothed wheel 5 made of injected plastics material, on a metal shaft 1 conventionally provided with longitudinal indents 2 for engagement.

The indents 2 are localized, on the periphery of the shaft 1, in the zone of reception of the moulded plastic toothed wheel 5.

At the other end of the shaft 1 there is provided, for example, in order to connect the article to be driven, such as a vehicle windscreen wiper for example, a knurled truncated cone 3 followed by a threaded cylinder 4.

A well known drawback of kinematic chains which use toothed wheels made of plastics material, such as the wheel 5 of FIG. 1, resides in the noise caused by such gears.

A particularly typical example resides in the devices for driving automobile windscreen wipers.

In the assembly of FIG. 1, it is question of a metal shaft 1 driven in rotation by the toothed wheel 5 made of plastics material.

The forces transmitted by the toothed wheel 5 to the shaft 1 may be considerable and the engagement 2 of this wheel 5 on the shaft 1 must therefore be extremely solid. The material of which this wheel 5 is constituted must consequently be a very hard plastics material, typically a glass-fiber reinforced material.

The toothed wheel 5 is typically driven by one or more other smaller pinions made of plastics material (not shown) which are themselves driven by a worm fixed on the shaft of the drive motor. It is generally at the gearing of these small pinions on the toothed wheel 5 that the noise is produced.

Document EP-A-0 303 113 may be cited as state of the art, which proposes to solve this difficulty by providing to use two different synthetic materials for making a toothed wheel similar to wheel 5 hereinabove:

a first thermoplastics material, made of hard matter, which ensures the desired rigid engagement on a metal shaft similar to shaft 1 hereinabove and which extends over a limited portion of the diameter of the wheel, a second thermoplastics material, made of less hard matter, but presenting vibration damping qualities, which surrounds the central halo formed by the first material and which forms the rest of the toothed wheel, outer toothing included.

However, this solution presents two drawbacks:

It is necessary to effect a solid engagement of the second portion of toothed wheel, or peripheral portion, on the first portion, or central portion. To that end, this rigid central portion must be provided with an outer engaging toothing on the peripheral portion, which renders the operation of manufacture delicate, all the more so as there may be problems of incompatibility between the hard material constituting this central portion and the less hard material constituting the peripheral portion. This increases the cost price of such a gearing.

The outer drive toothing presents, ipso facto, limited mechanical strength qualities, with the result that such a toothed wheel wears out more rapidly than a wheel according to FIG. 1 entirely constituted by a hard thermoplastics material.

In the particular case of devices for driving the rear windscreen wipers of vehicles, it is also known to reduce the gearing noises by using a single toothed wheel of which the central portion is provided with cut-outs and openings. Such a solution is not valid for front windscreen wipers where the large toothed wheel is driven by one or more plastic reduction gears, which is not the case for rear windscreen wipers where the single toothed wheel is driven directly by the worm. In addition, the rear windscreen wipers are less stressed.

As state of the art concerning the reduction of noise in toothed wheels, document EP-A-0340 812 may also be cited, which describes a toothed wheel formed by two halves adapted to be assembled by screws along a plane of join which is orthogonal to the axis of the wheel. In order to dampen the vibrations, two conjugate recesses are provided so as to form, after assembly, an inner cavity, this cavity receiving two viscoelastic dampers with stress plate, well known per se, in particular in the domain of skis. It will be readily appreciated that, although this solution may prove satisfactory from the standpoint of results, it is not so from an industrial standpoint, due to its complexity and therefore its high manufacturing cost.

Finally, U.S. Pat. No. 3 630 098 may also be cited, which describes a rotating gear which comprises a polyamide core and an outer surface made of polyamide containing a lubricant.

This gear is manufactured by a process of injection in two successive, and clearly distinct, steps.

SUMMARY OF THE INVENTION

The present invention relates to a process of manufacturing a rotating gear made of thermoplastics material, this gear presenting an outer toothing and an axial portion for transmitting movement, characterized in that it consists in producing this gear by co-injection, through the same injection nozzle, of two thermoplastics materials of different mechanical characteristics:

a first thermoplastics material presenting high performances of hardness which is injected in the common injection orifice, so as to form the envelope of the gear, this envelope comprising its axial drive portion as well as at least the outer skin of the toothing, and a second thermoplastics material, which is injected without waiting, in accordance with the technique of co-injection known per se, inside this first thermoplastics material not yet solidified, this second material presenting qualities of vibration damping, and consequently being less hard than the first.

BRIEF DESCRIPTION OF THE DRAWINGS

The invention will be more readily understood on reading the following description with reference to the accompanying drawings, in which.

DESCRIPTION OF PREFERRED EMBODIMENT

Figure 1:
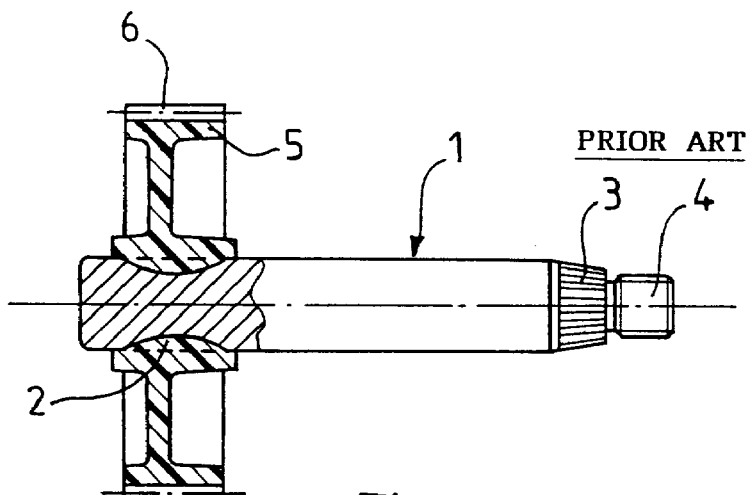
FIG. 1, to which reference has already been made, represents a "plastic toothed wheel+metal drive shaft" assembly produced according to the prior art.
Figure 2:
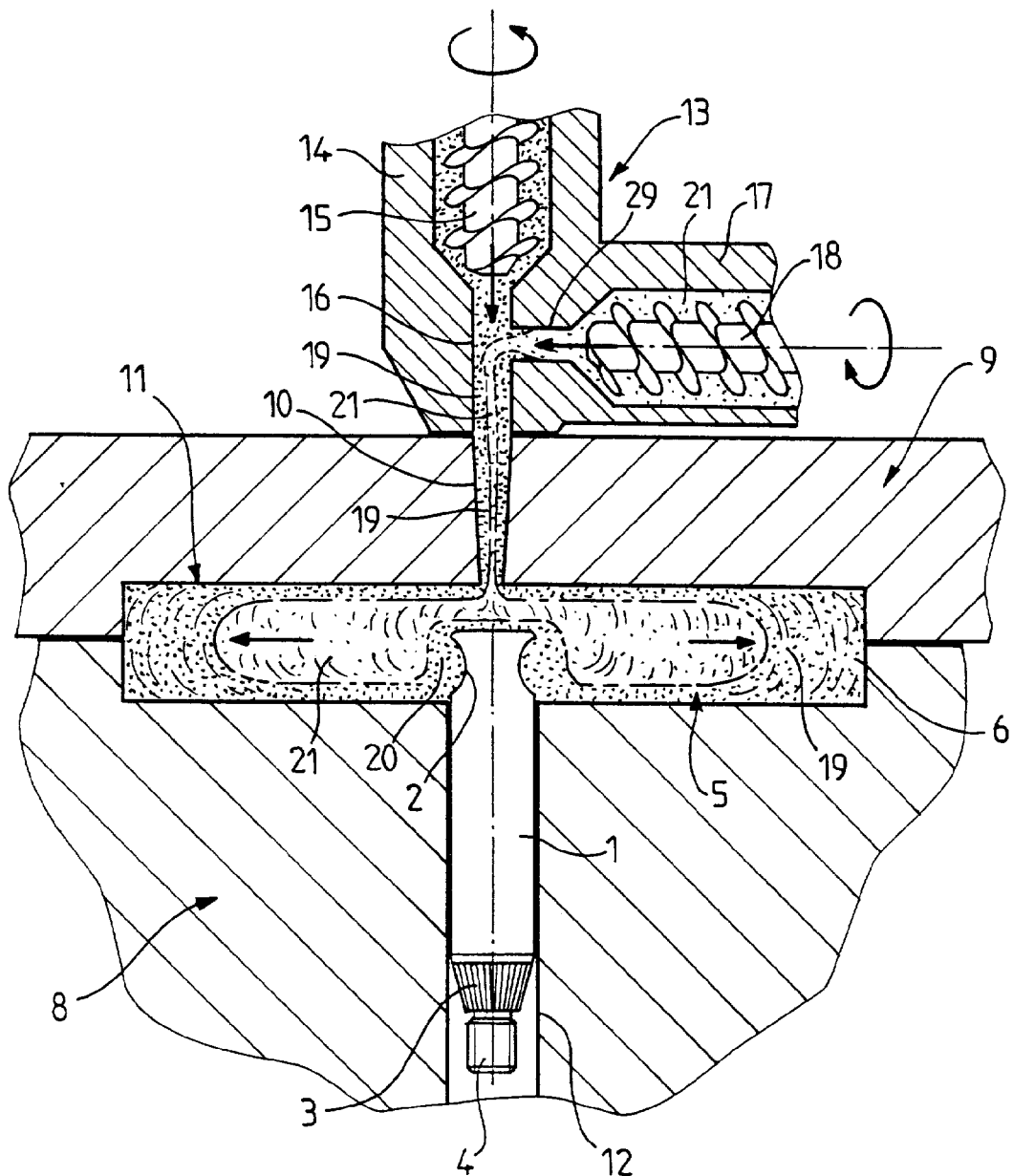
FIG. 2 shows how the same assembly, similar but in accordance with the invention, is produced by co-injection.

Referring now to FIG. 2, an assembly is to be manufactured, which will comprise, like that of FIG. 1 described hereinbefore, a metal shaft 1 bearing a toothed wheel 5 made of thermoplastics material which is firmly moulded on this shaft via longitudinal indents 2 for engagement.

As before, the metal shaft 1 is intended to be connected to the windscreen wipers via a knurled truncated cone 3 followed by a threaded cylinder 4.

In order to produce such an assembly 1, 5 in accordance with the invention in one operation of injection and so as to obtain a toothed wheel 5 which is both very hard in its central zone of engagement 20 and on its outer toothing 6, and damping and therefore more supple inbetween, a mould in two parts 8, 9 is used, whose cover 9 is pierced with an injection nozzle or channel 10 which opens out axially in the inner cavity 11 of the mould.

The nozzle 10 is vertical and it is coaxial to a channel 12, bored in the base 8 of the mould, which serves as channel for positioning and maintaining the metal shaft 1.

In order to produce the toothed wheel 5 and to fix it by moulding on the shaft 1, the invention employs the so-called "co-injection" technique which is presently used for producing, economically, plastic boxes for which it is desired to have an outer envelope made of noble plastic material, and an inner part of the walls which is constituted by an inexpensive filling material.

There is consequently applied on the cover 9 of the mould an injection unit 13 identical to those constructed for producing such boxes by co-injection, and consequently comprising in the same body:

- a first injection sleeve 14 equipped with an Archimedean screw 15 intended to advance the molten plastics material, and opening out in an outlet channel 16, itself coaxial and contiguous to the injection channel 10;
- a second injection sleeve 17, orthogonal to the first 14, and therefore horizontal in the present case, which also comprises an Archimedean screw 18 coaxial to an outlet channel 29 which itself opens out in the outlet channel 16 of the sleeve 14.

According to the invention, the vertical sleeve 14 is supplied with the molten components of a hard thermoplastics material 19, for example a glass-fiber reinforced matter. On the other hand, the horizontal sleeve 17 is supplied with the components of a thermoplastics material 21 which is less hard but which presents vibration damping properties, for example a polyethylene, silicone-reinforced A.B.S. or a P.T.F.E.-reinforced matter.

In accordance with the technique of co-injection, the screw 15 is firstly rotated alone, which advances the components of the molten "hard" matter in the outlet channel 16 and in the injection channel 10.

This matter then advances inside the cavity 11 as a function of the speed of injection previously programmed.

The flow of matter adheres on the walls. The difference in temperature between the mould and this matter tends to set the outer part of this matter, and to transform it into a sort of elastic balloon not yet solidified.

Rotation of screw 18 is set into action without waiting.

The components of the molten "damping" matter 21 are consequently injected into channels 16 and 10, then into cavity 11, and they pass inside the elastic envelope formed by the other matter 19, to "inflate" the latter, like a balloon.

Finally, the "hard" matter 19 is applied to the walls of the cavity 11 and fills the indents 2 for engagement, while the "damping" matter 21 fills the heart of the cavity, therefore surrounded by this envelope of "hard" matter 19.

It should be noted that the shaft 1 is inserted in the cavity 11 of the mould 8, 9 so as not to traverse said cavity, in order to allow free passage for the two thermoplastics matters 19, 21, but also so that the indents (or profiles) 2 for engagement are totally placed inside this cavity 11. Consequently, it is indeed the hard matter 19 which fills and surrounds these indents, in accordance with one of the two objects of the present invention.

Figure 3:
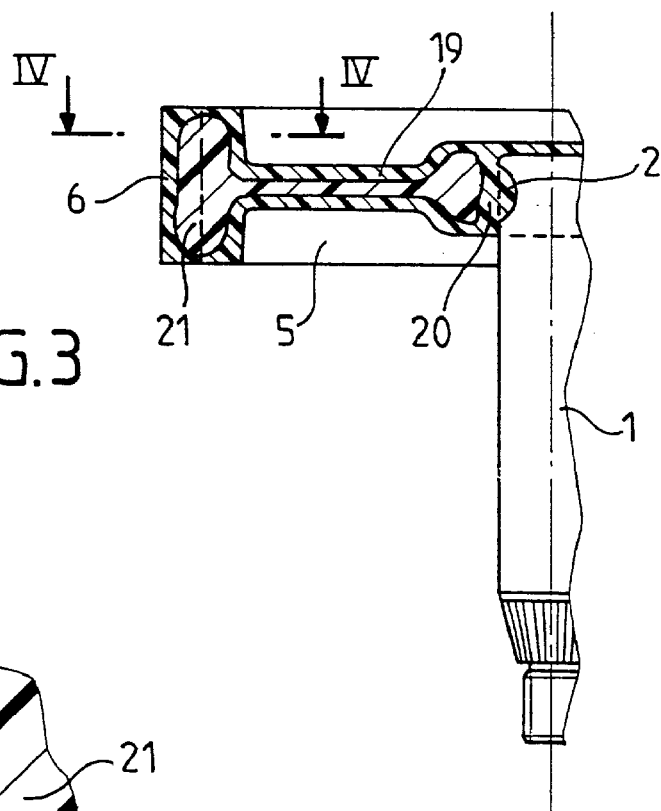
FIG. 3 is a longitudinal half-section of the "wheel-shaft" assembly thus obtained.
Figure 4:
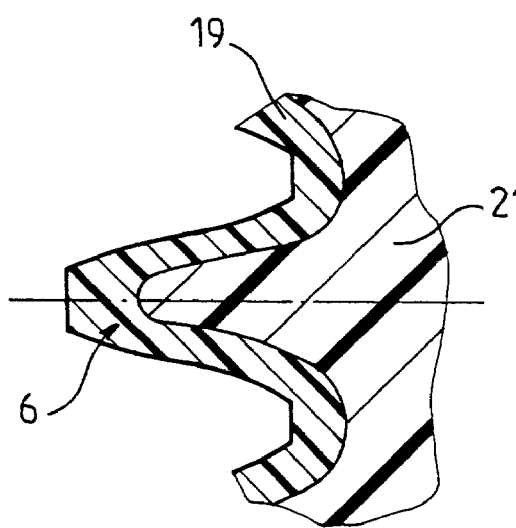
FIG. 4 is a detailed view in section along IV—IV of FIG. 3.

After cooling, demoulding and trimming, the result obtained is the one shown in FIGS. 3 and 4, where the gear wheel/shaft assembly 5, 1 comprises a toothed wheel 5 whose axial portion 20 for engagement is made of mechanically very hard and therefore resistant plastics matter, where the outer toothing 6 presents the same characteristics of hardness and resistance, while the heart of the toothed wheel 5 is constituted by a damping matter 21, which finally makes it possible, at lower cost due to the single operation of co-injection, to produce a gearing having properties of vibration- and therefore noise-damping, while retaining properties of mechanical resistance and hardness both in its axial portion for engagement and on its outer toothing.

It goes without saying that the invention is not limited to the embodiment which has just been described. For example, the relative thicknesses of the "hard" (19) and "damping" (21) materials may be other than those shown in FIGS. 3 and 4. For example they may be regulated, with the aid of parameters of injection, for the teeth of the outer toothing 6 to be totally constituted of hard material 19 and not only on the surface, as shown in FIG. 4. The indents 2 for engagement may also be replaced by other profiles, possibly protuberant profiles which the hard matter 19 would then simply envelop.

What is claimed is:

1. A process of manufacturing a rotating gear made of thermoplastic material, said gear having an outer toothing and an axial drive portion for transmitting movement, comprising producing said gear by co-injection into an injection mold, through a common injection orifice, of two thermoplastics materials having different mechanical characteristics:

a first thermoplastics material presenting high performances of hardness which is injected in the common injection orifice, so as to form an envelope of the gear, said envelope comprising an axial drive portion of said gear and at least an outer skin of the toothing, and a second thermoplastic material, which is injected without waiting, by co-injection, inside said first thermoplastics material not yet solidified, said second material having qualities of vibration damping, and being less hard than the first thermoplastics material.

2. The process of claim 1, wherein a coaxial shaft having at least one indent on which said gear must be fixed, is placed in the injection mold, said coaxial shaft being positioned so as to allow free passage, in the injection mold, for the two thermoplastics materials, but with the result that the indent for engaging the gear on said shaft is located totally inside said injection mold so that it is the first thermoplastic material which fills said indent.

3. The process of claim 2, wherein said first thermoplastics material is a glass-fiber reinforced thermoplastics material.

4. The process of claim 3 wherein said second thermoplastics material is selected from the group consisting of polyethylene, silicone-reinforced ABS, and PTFE reinforced plastic.

5. The process of claim 1, wherein said first thermoplastics material is a glassfiber reinforced thermoplastics material.

6. The process of claim 1 wherein said second thermoplastics material is selected from the group consisting of polyethylene, silicone-reinforced ABS, and PTFE reinforced plastic.

\* \* \* \* \*